United States Patent
Dillard et al.

[11] Patent Number: 5,851,494
[45] Date of Patent: Dec. 22, 1998

[54] SOLID PHASE SYNTHESIS REACTION VESSEL AND METHOD OF USING THE SAME

[75] Inventors: Lawrence W. Dillard, Hopewell; Ian Henderson; Michael H. J. Ohlmeyer, both of Plainsboro; John C. Reader, Princeton, all of N.J.

[73] Assignee: Pharmacopeia, Inc., Princeton, N.J.

[21] Appl. No.: 923,208

[22] Filed: Sep. 4, 1997

Related U.S. Application Data

[63] Continuation of Ser. No. 537,268, Sep. 29, 1995, abandoned.

[51] Int. Cl.$^6$ .................................................. C08F 2/00
[52] U.S. Cl. .................... 422/131; 422/50; 422/68.1; 422/134; 422/138; 435/87; 435/88; 525/50; 525/54.11; 530/333; 530/334
[58] Field of Search .................. 422/50, 68.1, 99, 422/102, 110, 111, 116, 131, 134, 138; 435/87, 88, 287; 525/50, 54.11; 530/333, 334

[56] References Cited

U.S. PATENT DOCUMENTS

| | | | |
|---|---|---|---|
| 3,557,077 | 1/1971 | Brunfeldt et al. | 935/88 |
| 3,715,190 | 2/1973 | Park et al. | 935/88 |
| 4,746,490 | 5/1988 | Saneii | 422/62 |
| 4,748,002 | 5/1988 | Neimark et al. | 422/116 |
| 5,039,488 | 8/1991 | Kohr | 422/68.1 |
| 5,053,454 | 10/1991 | Judd | 525/54.11 |
| 5,223,435 | 6/1993 | Kohr | 436/89 |
| 5,240,680 | 8/1993 | Zuckermann et al. | 422/67 |
| 5,288,464 | 2/1994 | Nokihara | 422/101 |
| 5,288,514 | 2/1994 | Ellman | 427/2 |
| 5,298,259 | 3/1994 | Lloyd et al. | 424/486 |
| 5,316,728 | 5/1994 | Hayashi et al. | 422/70 |
| 5,460,786 | 10/1995 | Nokihara | 422/116 |

OTHER PUBLICATIONS

Stewart, J. M. & Young, J. D.; (1984) *Solid Phase Peptide Synthesis* (Pierce Chem. Co., Rockford, IL) 2nd Ed., pp.125–139.

*Primary Examiner*—Timothy McMahon
*Attorney, Agent, or Firm*—Heslin & Rothenberg, P. C.

[57] ABSTRACT

A solid phase synthesis reaction vessel includes a vessel with a first inlet, a second inlet, and an outlet. A first stopcock is disposed within the first inlet and a second stopcock is disposed within the outlet. Solid phase material is prevented from escaping the reaction vessel via the outlet while allowing fluid to flow through the outlet by a frit. In one embodiment, the reaction vessel includes an outer hollow shell surrounding the vessel to allow cooling or heating fluid to flow therein for controlling the temperature in the interior reaction volume. The solid phase synthesis reaction vessel provides for the independent opening and closing of each of the inlets and outlet to provide for various ways of draining the vessel, varying the conditions within the vessel, and/or adding additional materials into the vessel.

10 Claims, 3 Drawing Sheets

SOLID PHASE SYNTHESIS REACTION VESSEL AND METHOD OF USING THE SAME

CROSS REFERENCE TO RELATED APPLICATION

This application is a continuation of earlier U.S. patent application, Ser. No. 08/537,268, filed Sep. 29, 1995 now abandoned.

BACKGROUND OF THE INVENTION

The present invention relates to the field of solid phase chemistry and more particularly to a solid phase synthesis reaction vessel and method of using the same.

Currently, methods exist for the combinatorial synthesis of large numbers of derivatives of small organic compounds, followed by the screening of these compounds against key receptors or enzymes, thereby accelerating the discovery of useful therapeutic structures. For example, Ellman, U.S. Pat. No. 5,288,514 is directed to solid phase and combinatorial synthesis of benzodiazepine compounds on a solid support. Combinatorial chemical libraries of compounds encoded with tags and the use of these libraries in assays to discover biologically active compounds are described in U.S. patent application Ser. No. 212,024 filed on Mar. 11, 1994 for a combinatorial sulfonamide library and U.S. patent application Ser. No. 239,302 filed on May 6, 1994 now abandoned for a combinatorial dihydrobenzopyran library. In each case, libraries of compounds are synthesized on solid supports in suitable reaction vessels. The reactions are typically induced by placing solid phase support materials along with reagents and solvents into reaction vessels and agitating the same by shaking, optionally while applying heat.

The reaction vessels used in the prior art for solid phase synthesis typically were adapted for the production of peptides, and contained a single inlet for the insertion of solid phase support materials, reagents, and solvents and a single outlet leading therefrom. However, such reaction vessels did not effectively allow for the draining of the reaction vessel through the use of a fluid such as a gas under positive pressure, particularly when keeping the inlet sealed.

Other types of reaction vessels may also be used to perform solid phase synthesis reactions. These types of vessels allow for the use of a fluid, such as a gas under pressure, to drain the reaction vessel and/or maintain an inert atmosphere within the reaction vessel. However, they may suffer from various shortcomings. For example, these reaction vessels generally are configured with valving systems which do not allow for independent closing of an inlet and outlet. Moreover, these reaction vessels, because of their complex valving systems, are not capable of being readily sealed for purposes of maintaining a stable and/or inert condition within the reaction vessel, and are not truly portable when charged with reactive materials.

As contrasted with the solid phase synthesis of peptides, in the solid phase synthesis of diverse small molecules it is often desirable to vary the temperature within the reaction vessel. Therefore, it would be desirable to have means for heating or cooling so as to allow for precise control of the temperature within the reaction vessel.

SUMMARY OF THE INVENTION

It is a goal of the present invention to achieve a solid phase synthesis reaction vessel having multiple inlets along with one or more outlets to effectively allow for the draining of the reaction vessel using a fluid such as an inert gas under pressure.

It is a further goal of the present invention to achieve such a reaction vessel where the inlets and outlets are independently closeable to provide maximum flexibility in varying reaction conditions, draining and/or filling the reaction chamber.

It is an additional goal of the present invention to achieve a reaction vessel which is portable and transportable without the effect of significantly varying the conditions within the reaction chamber and without the transport of external valving equipment, waste reservoirs and/or gas supply means.

It is also a goal of the present invention to achieve a reaction vessel having the means to precisely control the temperature therein, preferably by use of a heating or cooling fluid.

The aforementioned features and advantages may be achieved by use of the solid phase synthesis reaction vessel constructed in accordance with the principles disclosed herein. The reaction vessel may comprise an enclosed vessel having a first and a second inlet located proximate to a first end thereof, and an outlet located proximate to a second end thereof; a first stopcock disposed within the first inlet; a second stopcock disposed within the outlet; and means for preventing solid phase material from escaping from the reaction vessel via the outlet while allowing fluid to flow through the outlet.

The means for preventing solid phase material from escaping from the reaction vessel via the outlet while allowing fluid to flow through the outlet may include a first frit disposed within the vessel at the second end thereof, so as to prevent solid phase materials from escaping from the interior chamber of the vessel via the outlet. So as to minimize void volume in the vessel, the distance between the first frit and the outlet should be as small as possible and, preferably, less than the thickness of the first frit.

The body of the reaction vessel is preferably made of glass, which is preferably strengthened at a location of the second end of the vessel adjacent to the outlet. The outlet may extend at an angle from the central axis of the vessel. The angle preferably is greater than or equal to ninety degrees. The second inlet may also extend at an angle from the central axis of the vessel.

The reaction vessel may further include means for preventing solid phase material from escaping from the reaction vessel via the first inlet, while allowing fluid to enter the vessel via the first inlet. In one such embodiment, a second frit is located within the first inlet and disposed so as to impede movement of solids from the interior chamber of the vessel into said first inlet. A first stopcock is preferably disposed within the passage comprising the first inlet, exterior to said second frit.

The second inlet may include a ground upper section capable of receiving a stopper therein to seal the second inlet. Alternatively, the second inlet may include a threaded end for receiving a threaded cap. The threaded end or cap is preferably made of teflon or similar materials.

The solid phase synthesis reaction vessel may further comprise a hollow outer shell (rather than a solid wall) surrounding the interior reaction volume of the vessel. Such a modified reaction vessel preferably includes a fluid inlet adapted to allow a heating or cooling fluid to flow into the shell, and a fluid outlet adapted to allow said heating or cooling fluid to flow out of the shell.

Accordingly, the solid phase synthesis reaction vessel may comprise an enclosed vessel enclosed by a hollow shell, the interior of the vessel having a first and second inlet located proximately to a first end thereof, and an outlet located proximately to a second end thereof; a first stopcock disposed within the first inlet; a second stopcock disposed within the outlet; and means for a heating or cooling fluid to flow into, through, and out of said hollow shell.

In another aspect, the invention includes a method of performing a solid phase synthesis reaction using the aforementioned reaction vessel by closing, with a first stopcock, the first inlet of the reaction vessel; closing, with a second stopcock, the outlet of the reaction vessel; charging the reaction vessel, through the second inlet, with solid phase support material, reagent and solvent; closing the second inlet; and agitating the reaction vessel to induce a solid phase reaction within the vessel.

The method may further comprise opening said first stopcock to allow fluid into the reaction chamber either before or after the agitating occurs. Such fluid may be an inert gas under pressure. Reagents and additional solvents may be added to the vessel via the first inlet after opening the first stopcock.

The method further comprises removing solvent from the reaction vessel by opening the second stopcock and/or opening the second inlet to allow air into the reaction vessel, and a positive pressure applied. Alternatively, the solvent may be removed by suction.

The method may further comprise adding additional solid phase support materials, reagent or solvent into the reaction vessel, during or after agitation, through the second inlet. Additional solvent may be added to the reaction vessel by opening the second stopcock and allowing the additional solvent to pass into said outlet and into said vessel. The reaction vessel may also be heated and/or cooled as necessary for the type of reaction being performed.

BRIEF DESCRIPTION OF THE DRAWINGS

The invention will be described in conjunction with the detailed description thereof when read in reference to the drawings, in which.

DETAILED DESCRIPTION

Figure 1:
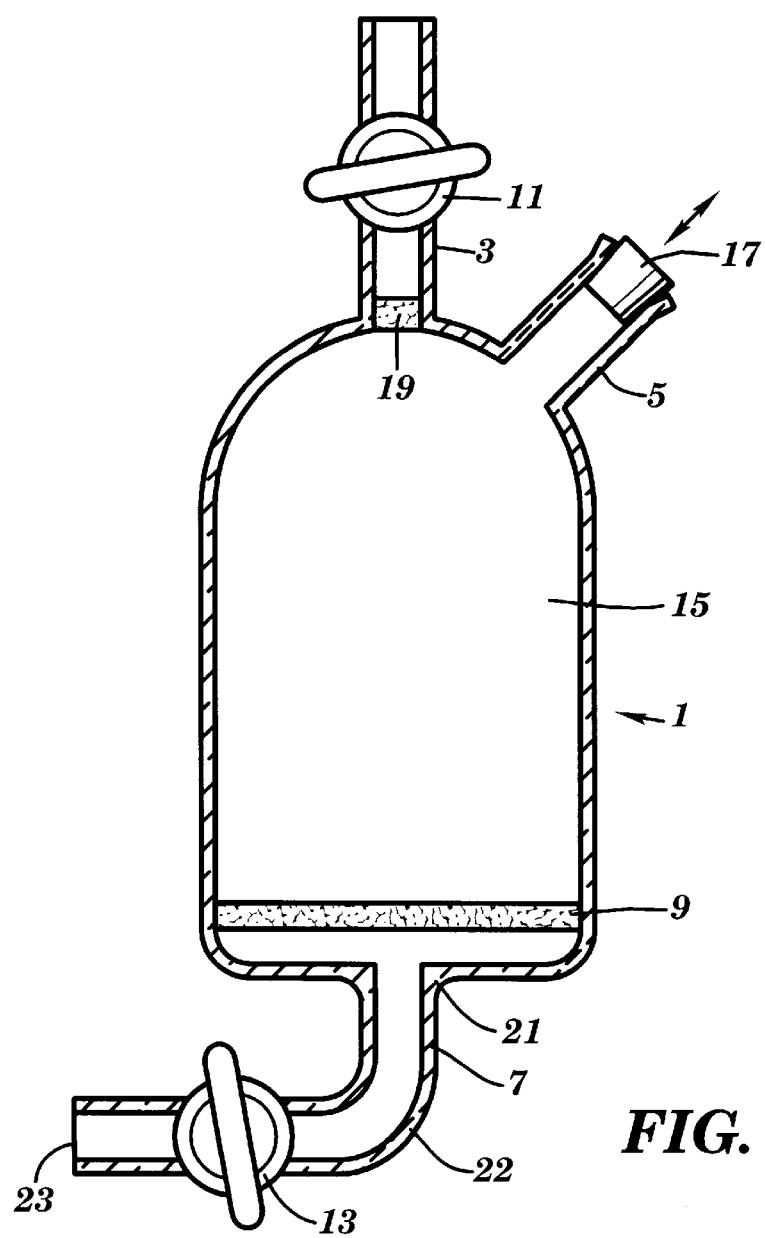
FIG. 1 depicts a sectional view from the side of a solid phase synthesis reaction vessel constructed in accordance with the principles of the present invention.

Referring to FIG. 1, the solid phase synthesis reaction vessel constructed in accordance with the principles of the present invention includes a vessel 1, defining an interior volume 15, a first inlet 3, a second inlet 5, an outlet 7, and means for preventing solid phase material from escaping from the reaction vessel via the outlet 7 while allowing fluid to flow through the outlet 7.

The first inlet 3 is preferably located proximately to a first end of the reaction vessel 1, while the outlet 7 is preferably located proximately to a second end of the reaction vessel 1. In FIG. 1, the first inlet 3 is located along a central axis of the reaction vessel. The first inlet 3 may be defined as an enclosed passage having two ends, with an orifice at the exterior end thereof and an opening at the interior end thereof communicating with interior volume 15. The first inlet 3 contains a first stopcock 11 disposed therein. The first inlet 3 and/or outlet 7 may be removably attachable to a gas supply, vacuum, or waste reservoir. The outlet 7 may be defined as an enclosed passage having two ends, with a discharge opening 23 at the exterior end thereof and an opening at the interior end thereof communicating with interior volume 15. The outlet 7 contains a second stopcock 13 disposed therein. Both the first stopcock 11 and second stopcock 13 may be integrally formed to the first inlet 3 and to the outlet 7, respectively, and each stopcock should operate independently in order to allow fluids such as gases and/or solvents to flow independently through the first inlet 3 and the outlet 7. The first inlet 3 may be opened by opening the first stopcock 11 while keeping the outlet 7 sealed by closing the second stopcock 13. Conversely, the second stopcock 13 may be opened while the first stopcock 11 is closed. Such independent operation provides for maximum flexibility in filling, draining and/or varying the reaction conditions. For example, inert gases can be blown into the reaction vessel through the first inlet 3 or outlet 7. This can occur with the second inlet 5 either opened or closed. Also, fluids such as solvents may be drained from the interior volume 15 of the reaction vessel 1 under a vacuum if desired by closing the second inlet and one of the two stopcocks 11 or 13, and imparting a suction through the open stopcock.

The second inlet 5 is preferably located proximately to the first end of the reaction vessel 1 and is capable of allowing the passage of solid phase support materials, reagents and solvents therethrough. The second inlet 5 may include a 14/20 ground fitting adapted to receive a rubber, teflon or glass stopper 17. Removal of the stopper 17 for venting and draining of reaction vessel 1 may often lead to entrainment of solid phase support materials in the interface between the stopper 17 and second inlet 5, which may subsequently result in undesirable grinding of the solid phase material and leakage of reactants and solvents from the vessel 1. However, the present invention avoids this problem, since the facile venting and draining of the vessel may occur without removal of the stopper 17 from the second inlet 5 by proper use of the first inlet 3 and outlet 7. Moreover, the first inlet 3 and second inlet 5 allow solid material to be added to the vessel 1 while maintaining an inert atmosphere.

Figure 2:
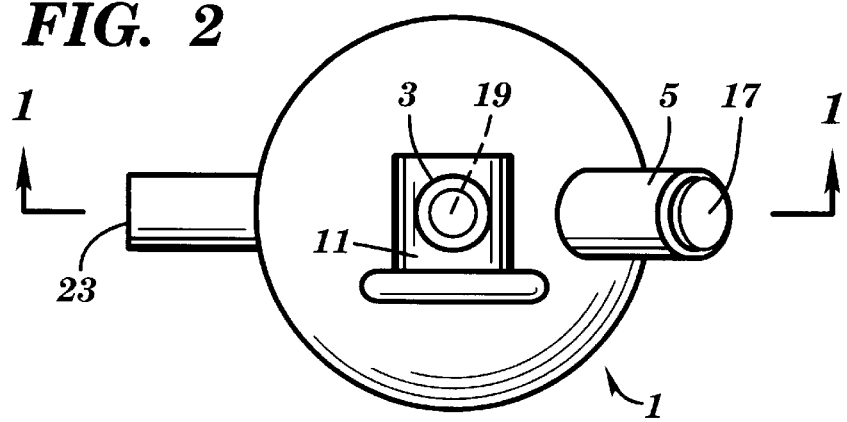
FIG. 2 depicts a sectional view from the top of the solid phase synthesis reaction vessel depicted in FIG. 1.

The means for preventing solid phase material from escaping from the reaction vessel via the outlet 7 while allowing fluid to flow through outlet 7 may include a first frit 9 located within interior volume 15 near the second end of reaction vessel 1. Preferably, the first frit 9 is disposed as closely as practicable to the outlet 7 to minimize the void volume area within reaction vessel 1 between the first frit 9 and the outlet 7. Preferably, the distance between the first frit 9 and the outlet 7 should be less than the thickness of the first frit 9. The first frit 9 should be of a coarseness which prevents the solid phase materials within the interior volume 15 from passing therethrough while allowing fluids to pass therethrough. Preferably, the first frit 9 is made of glass and shaped so as to conform with the second end of the reaction vessel. In FIGS. 1 and 2 the first frit 9 is disk-shaped to conform to the second end of reaction vessel 1.

Means for preventing solid phase material from escaping from the reaction vessel via the first inlet 3 while allowing fluid to flow through first inlet 3 is also contemplated in the present invention. Such means may include a second frit 19, preferably similar in coarseness and construction to the first frit 9. The second frit 19 may be located within the reaction vessel 1 to prevent solid phase materials in the reaction vessel from entering the first inlet 3 during agitation of the reaction vessel 1. The second frit 19 should also be of a coarseness which prevents solid phase materials from passing therethrough while allowing fluids to pass therethrough. In lieu of first frit 9 or second frit 19, other means such as screens, filters or mesh materials may suffice for use in the present invention. Also, as shown in FIG. 1, the second frit 19 may be disposed within the first inlet 3.

Typically, the reaction vessel is cylindrically shaped, having a circular perimeter, as shown in FIG. 2. The outlet 7 may have a curved portion 22 so that a discharge opening 23 therein extends approximately 90° from a central axis extending lengthwise through the reaction vessel 1. The reaction vessel 1 preferably is made of glass or tempered glass, and preferably has a higher strength at a particular location 21 near the second end of the reaction vessel 1 adjacent to the outlet 7. Strengthening of the glass at this location 21 may minimize the propensity of the reaction vessel 1 to break due to excessive stress which may be caused by impact, cooling and/or heating of the reaction vessel 1 and/or affixing tubing to the outlet 7. The first and second stopcocks 11, 13 are preferably made of teflon, which are commercially available. The second inlet 5, when having a 14/20 ground glass joint, may be comprised of solid glass which is also commercially available and the stopper 17 may also be of teflon, ground glass or rubber depending upon the desired seal and type of reaction to be performed.

Figure 3:
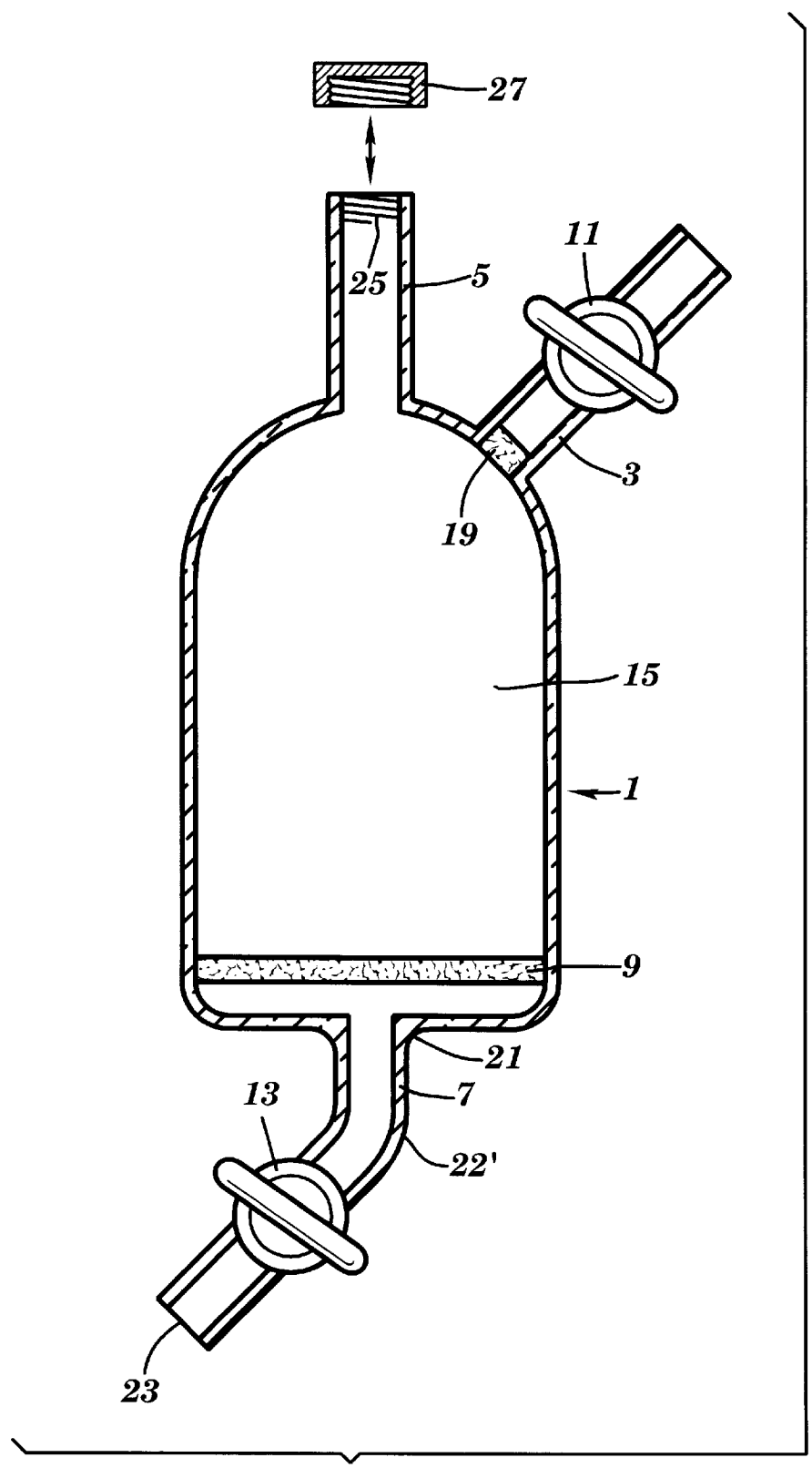
FIG. 3 depicts a sectional view from the side of another embodiment of a reaction vessel constructed in accordance with the principles of the present invention.

Referring now to FIG. 3, an alternative embodiment of the reaction vessel, constructed in accordance with the principles of the present invention, is disclosed. In comparison to the reaction vessel of FIGS. 1 and 2, the locations of the first inlet 3 and second inlet 5 are reversed. Also, the second inlet 5 contains a threaded end 25 which receives a threaded cap 27 thereon by screwing the cap 27 to the second inlet 5. The cap 27 and/or second inlet 5 are made of materials conventional in the art, e.g., teflon. Such screw-type capping of second inlet 5 affords a tight seal so as to minimize the leakage of reagents and solvents from reaction vessel 1.

A curved portion 22' of outlet 7 may allow the discharge opening 23 of the outlet 7 to extend at an angle equal to or less than 90° from a central axis extending through the reaction vessel 1. Orientation of the discharge opening 23 at this angle, in a similar or like manner as shown in FIG. 3, allows for solvents, reagents or the like to be easily drained from the reaction vessel through the outlet 7 without rotation of reaction vessel 1 and without the accumulation of solvents within the curved portion 22' of the outlet 7 or therebelow.

Figure 4:
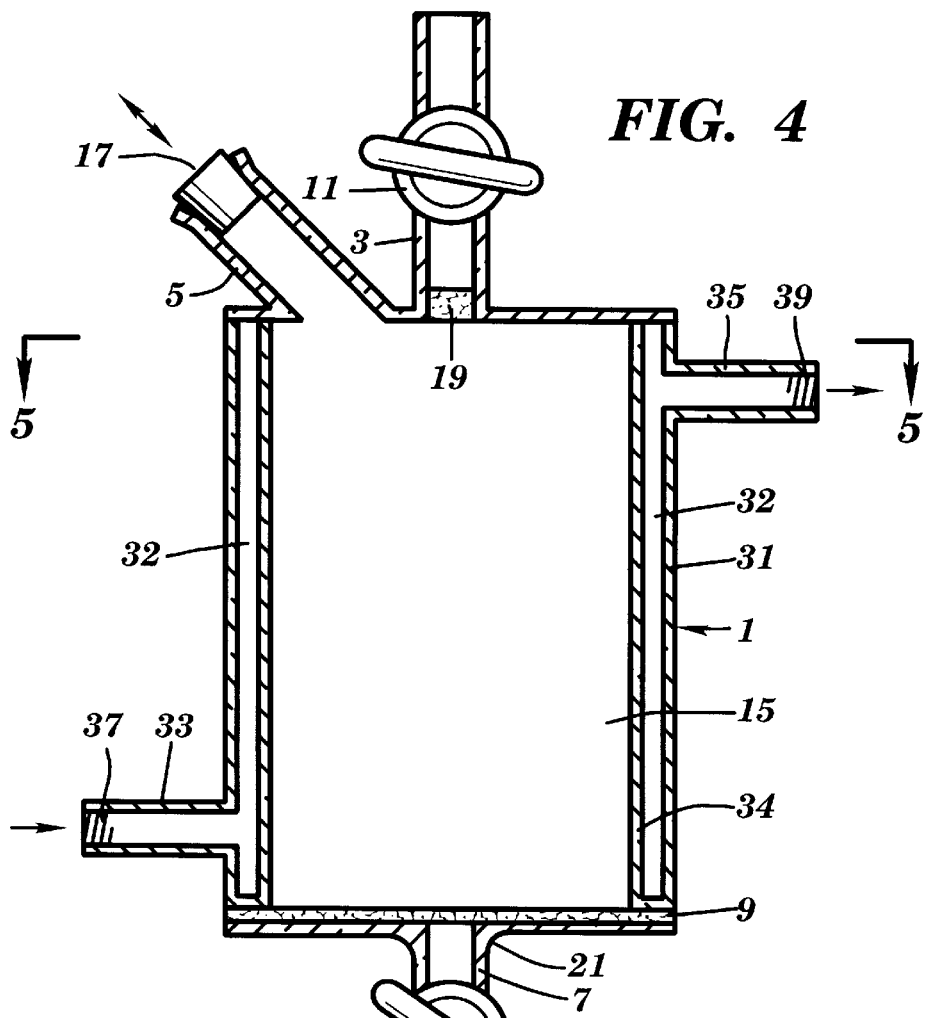
FIG. 4 depicts a sectional view from the side of another embodiment of a solid phase synthesis reaction vessel constructed in accordance with the principles of the present invention, enclosed by a hollow outer shell rather than a solid wall, the shell providing means for heating or cooling the contents of the reaction vessel by circulation of a heating or cooling fluid through said shell.
Figure 5:
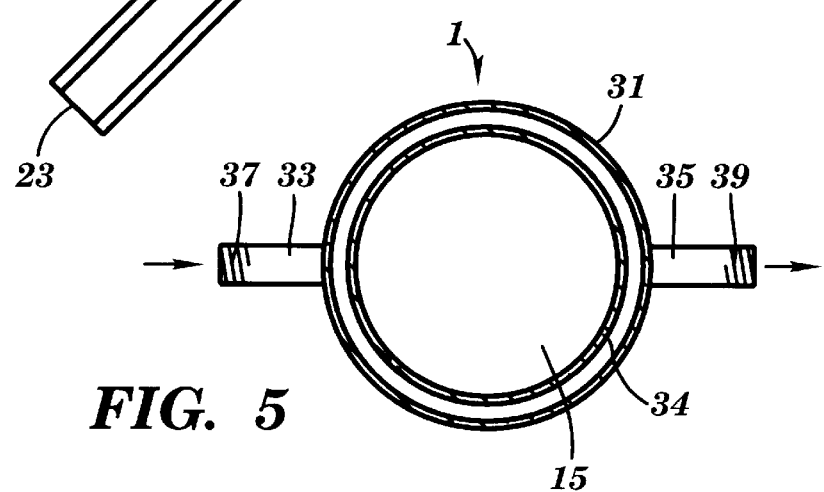
FIG. 5 depicts a sectional view from the top of the solid phase synthesis reaction vessel of FIG. 4.

During the solid phase synthesis of small molecules, it is often desirable to precisely vary and control the temperature in the interior volume of the reaction vessel. Referring to FIGS. 4 and 5, depicted is a reaction vessel 1 constructed in accordance with the principles of the present invention. The vessel is similar to those depicted in FIGS. 1–3, but it is enclosed by a hollow shell rather than a solid wall. The shell comprises an outer wall 31 and an inner wall 34, defining a liquid tight space 32 therebetween. Interior volume 15 of the reaction vessel is enclosed by inner wall 34. A fluid inlet 33 is provided through outer wall 31 to allow for a heating or cooling fluid, such as water, to flow within space 32. A fluid outlet 35 is provided at another location through outer wall 31, allowing the fluid flowing within the space 32 to exit therefrom. Preferably the fluid inlet 33 is located at a lower portion of the reaction vessel while the fluid outlet 35 is located at an upper portion of the reaction vessel to prevent fluid from stagnating within the space 32. Both fluid inlet 33 and fluid outlet 35 may have threaded ends 37, 39 for the attachment of fittings to allow fluid to be supplied thereto and therefrom, respectively. Further, these threaded ends may allow caps (not shown) to be threaded thereon for sealing of the fluid within the space 32, thereby allowing the reaction vessel to be easily transported while maintaining the reaction chamber temperature. By flowing a cooling or heating fluid within the space 32 through the fluid inlet 33, the temperature in interior volume 15 may be varied by controlling the temperature of the fluid entering space 32 via fluid inlet 33. Outer wall 31 may be constructed of glass or any other suitable material which is also capable of withstanding fluctuations in temperature. Moreover, outer wall 31 may be enhanced with an insulative material to help maintain the temperature in interior volume 15.

The reaction vessels constructed in accordance with the principles of the present invention may be used for solid phase synthesis reactions such as those described in U.S. Pat. No. 5,288,514; U.S. patent application Ser. No. 212,024 filed on Mar. 11, 1994; and U.S. patent application Ser. No. 239,302 filed on May 6, 1994, each of which is hereby incorporated by reference and made a part of the disclosure herein.

The reaction vessel 1, such as that shown in FIGS. 1 and 2, may be filled with the appropriate solid phase material, reagents and solvents via the second inlet 5. However, solvents and fluid reagents could be charged into interior volume 15 via the first inlet 3 and/or outlet 7 by the connection of supply tubes thereto, the application of pressure and/or gravity and manipulation of the stopcocks 11, 13. The solid phase material is typically in a bead form and may include any polymeric material e.g., polystyrene, Tenta-Gel® etc. However, other types of materials, reagents, and solvents as described in Ellman U.S. Pat. No. 5,288,514, U.S. patent application Ser. No. 212,204, and U.S. patent application Ser. No. 239,302 may also be used. Reagents include all chemicals commercially available and those synthesized at Pharmacopeia, Inc., Princeton, N.J., U.S.A. Many types of aqueous and organic solvents may be used, including but not limited to water, dichloromethane, methanol, etc.

Vessel 1 is then closed by closing the stopcocks 11, 13 and by inserting the stopper 17 into the second inlet. The vessel 1 is then agitated. Typically this is done by attaching the vessel to a wrist action shaker using pinch clamps, and then shaking the vessel. The agitation or shaking may occur for various times until the desired reaction is complete. Upon completion of the reaction, the reaction vessel 1 is typically drained of the excess reagents and solvents. This is usually done by opening both stopcocks 11, 13 and applying a positive pressure to the first inlet 3 while attaching the outlet 7 to a waste collection flask (not shown). However, the reaction vessel 1 allows for various methods for draining interior volume 15 and for removing excess reagents and solvents. The reaction vessel 1 remains portable even when a sealed interior volume 15 is maintained, while allowing for various ways of draining the vessel 1 and/or adding additional solid phase material to the interior volume 15.

If additional solid phase material is to be added to the interior volume 15 after a certain number of shaking cycles and it is not necessary to maintain an inert reaction chamber, stopcocks 11, 13 may be closed while additional solid phase materials are added to the vessel via the second inlet 5. However, if a relatively inert interior volume 15 is desired, the first inlet 3 and/or outlet 7 may be attached to an inert gas supply means, and the stopcocks 11 and/or 13 may be opened while the stopper 17 is removed from the second inlet. Additional reagents, solvents, or solid phase support materials thus may be charged to the interior volume 15 via the second inlet 5 while flowing the inert gas therethrough under a positive pressure.

An inert atmosphere may also be created by equipping the reaction vessel 1 with a rubber stopper 17 in lieu of a glass stopper 17 placed within the second inlet 5 to seal the same. An inert gas may then be delivered through a needle (not shown) placed through the rubber stopper 17 into the vessel. This can be performed while first stopcock 11 and/or second stopcock 13 is closed. Alternatively, if a vacuum condition within the reaction chamber is desired, suction may be applied to either the first inlet 3 and/or the outlet 7. By opening the appropriate stopcock 11 or 13, suction may be applied to induce a vacuum within the reaction chamber. For subsequent washings of the solid phase materials, the reaction vessel 1 may be filled with washing solvent via the second inlet 5 and, after being agitated (typically by shaking for approximately five minutes), drained. This draining can occur in the same manner as previously described for excess reagents and solvents. Typically, this washing procedure is repeated ten to twenty times.

If heating of interior volume 15 is desired, a heating apparatus (not shown) such as a heating tape strapped around the vessel body may be utilized in conjunction with a thermocouple inserted through a rubber stopper 17 inserted into the second inlet or through the first stopcock 11 disposed within first inlet 3. Both the heating tape and thermocouple may be connected to an external temperature controller. The integral first and second stopcocks 11, 13 when closed allow for the entire reaction vessel 1 to be transported without compromising the conditions within the interior volume 15. Alternatively, if the stopcocks 11, 13 are closed and the stopper 17 is tightly placed within the second inlet in order to create a liquid tight seal, the reaction vessel can be immersed in a temperature controlled bath to vary and control the temperature within the reaction vessel.

The reaction vessel depicted in FIGS. 3, 4 and 5 may be used in a similar manner as discussed above. However, the second inlet 5 of the reaction vessel depicted in FIG. 3 may be sealed by screwing a threaded cap 27 onto the threaded opening of the second inlet 5. Heating and cooling of reactions performed in the reaction vessel shown in FIGS. 4 and 5 may be performed, in addition to the ways previously discussed, by flowing fluid at a desired temperature into the fluid inlet 33, through space 32, and out of fluid outlet 35. Fluid may be pumped from a supply means into the fluid inlet 33. Fluid exiting the fluid outlet 35 may be collected in a reservoir (not shown) and/or recirculated through the fluid inlet 33.

Although the invention has been described in connection with the embodiments depicted herein, various modifications and variations may be made to these embodiments without departing from the scope of the invention as defined by the following claims.

What is claimed is:

1. A method of performing a solid phase synthesis reaction to produce a non-peptide small organic compound, said method comprising:

closing, with a first stopcock, the first inlet of a reaction vessel having a first inlet and a second inlet disposed proximately to a first end thereof, an outlet disposed proximately to a second end thereof, and means for preventing solid phase material from escaping from the reaction vessel via the outlet while allowing fluid to flow through the outlet;

closing, with a second stopcock, the outlet of said reaction vessel;

charging the reaction vessel, through the second inlet, with solid phase support material, reagent and solvent;

closing said second inlet; and agitating the reaction vessel to induce a solid phase reaction within the reaction vessel to produce a non-peptide small organic compound.

2. The method of claim 1 further comprising opening said first stopcock to allow fluid into the reaction vessel after said agitating occurs.

3. The method of claim 2 wherein said fluid comprises an inert gas under pressure.

4. The method of claim 3 further comprising removing solvent from the reaction vessel by opening said second stopcock.

5. The method of claim 2 further comprising opening said second inlet to allow air into said reaction vessel.

6. The method of claim 4 further comprising adding at least one of additional solid phase support material, reagent or solvent into said reaction vessel through the second inlet.

7. The method of claim 4 wherein said solvent is removed by suction.

8. The method of claim 5 further comprising adding additional solvent into the reaction vessel by opening said second stopcock and allowing said additional solvent to pass into said outlet and into said vessel.

9. The method of claim 1 further comprising heating or cooling the reaction vessel.

10. The method of claim 1 wherein said reaction vessel comprises an outer hollow shell surrounding an interior reaction volume, and wherein the temperature of the interior reaction volume is varied by flowing fluid through the outer hollow shell.

* * * * *